350-271 SR
4/12/77    OR    4,017,162

United States Patent [19]
Mills

[11] 4,017,162
[45] Apr. 12, 1977

[54] ADJUSTABLE SLIT MECHANISM

[75] Inventor: James Philip George Mills, Doncaster, Australia

[73] Assignee: Varian Techtron Pty. Ltd., Mulgrave, Australia

[22] Filed: Jan. 26, 1976

[21] Appl. No.: 652,451

Related U.S. Application Data

[63] Continuation of Ser. No. 496,439, Aug. 9, 1974, abandoned.

[30] Foreign Application Priority Data

Aug. 13, 1973   Australia ............................ 4456/73

[52] U.S. Cl. ................................................. 350/271
[51] Int. Cl.² ...................... G01J 3/04; G05D 25/00
[58] Field of Search ................................... 350/271

[56] References Cited

UNITED STATES PATENTS

| 2,705,440 | 4/1955 | George et al. ...................... 350/271 |
| 2,914,987 | 12/1959 | Crosswhite et al. ................ 350/271 |

FOREIGN PATENTS OR APPLICATIONS

| 887,238 | 1/1962 | United Kingdom ................ 350/271 |
| 1,203,228 | 8/1970 | United Kingdom ................ 350/271 |

Primary Examiner—John K. Corbin
Assistant Examiner—F. L. Evans
Attorney, Agent, or Firm—Stanley Z. Cole; Gerald M. Fisher; John J. Morrissey

[57] ABSTRACT

A metal foil or plate for use in the slit mechanism of optical systems and having two jaw sections between which the slit is defined. The jaw sections are interconnected through an integral hinge portion of the plate which is adaptable to flex so that the jaw sections can move towards and away from each other and thereby vary the slit width. When incorporated in actual slit mechanism, the plate, or at least a portion thereof, is interposed between two mounting surfaces so that the jaw sections are maintained coplanar, and an actuator for causing relative movement of the jaw sections is connected to another section of the plate which is integrally connected with each jaw section through a relatively narrow plate portion. The last mentioned section of the plate and the hinge means form the only connections between the jaw sections.

38 Claims, 8 Drawing Figures

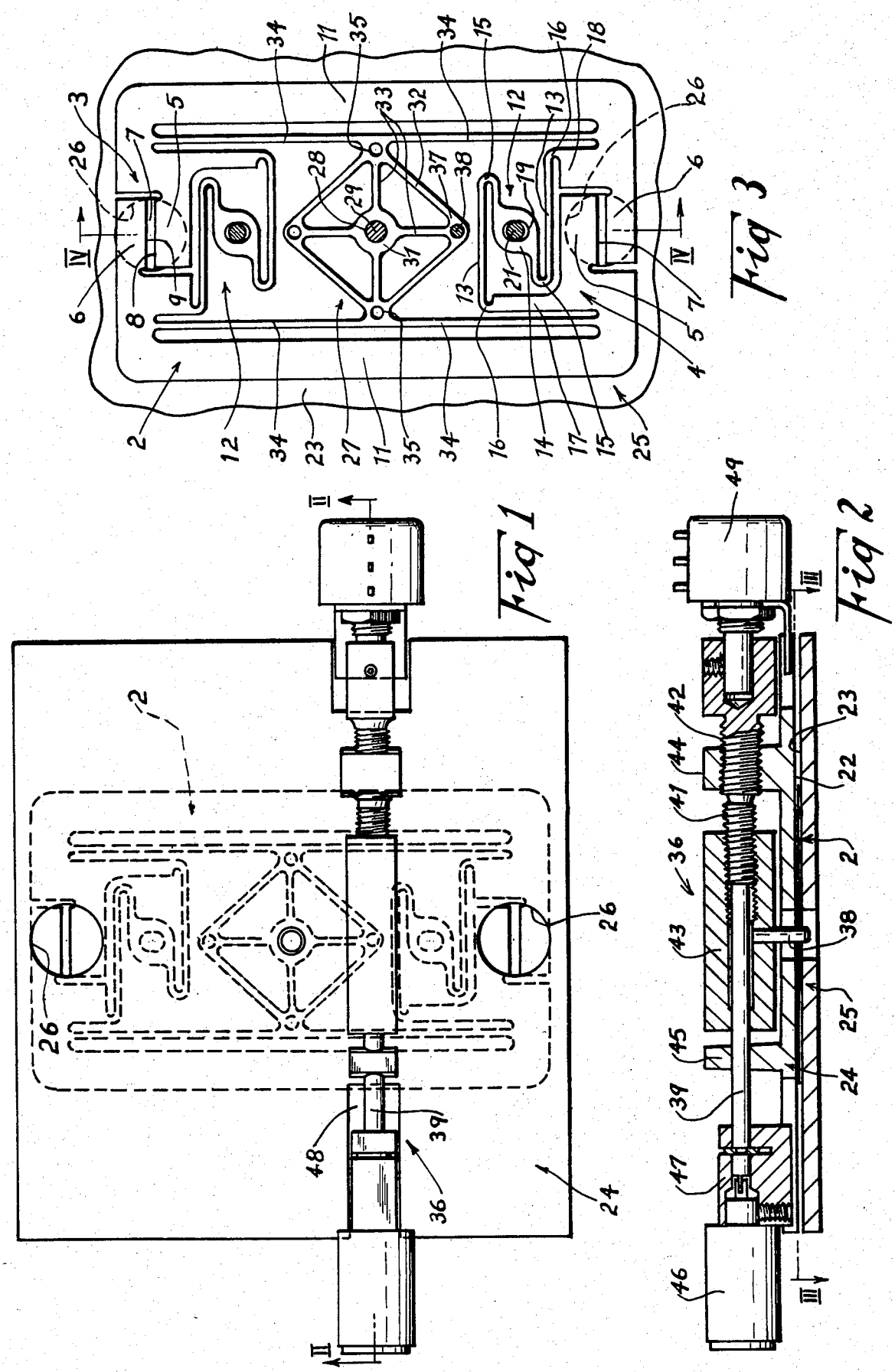

ADJUSTABLE SLIT MECHANISM

This is a continuation of application Ser. No. 496,439 filed Aug. 9, 1974, now abandoned.

BACKGROUND OF THE INVENTION

1. Field of the Invention

This invention relates to slit mechanism for use in spectrophotometers and other instruments and apparatus having an optics system which requires the provision of an adjustable aperture. One particular application of adjustable slit mechanism is in monochromators as used in spectrophotometers and other instruments and apparatus, and it will be convenient to hereinafter describe the invention in relation to that example application.

2. Description of the Prior Art

Spectrophotometer monochromators require the provision of a narrow rectangular slit which has straight parallel longitudinal edges, and it is preferred that the slit width be adjustable. Many attempts have been made to develop satisfactory adjustable slit mechanism for such monochromators, but prior to the present invention the commercially available mechanisms have been of complex and expensive construction and/or not entirely satisfactory in operation. A difficulty has existed in providing means whereby the jaw width can be adjusted over a suitable range while maintaining the desired parallelism between the longitudinal edges. The slit is defined between two jaws, and the mechanism is either unilateral in which one jaw only is movable relative to the other, or bilateral in which both jaws are movable.

The or each movable jaw must be mounted in such a way that parallelism is maintained, and that generally requires a highly sophisticated hinge or slide mounting. Hinge mountings are generally preferred in view of the extremely high quality finish required in slide mountings, but the commonly employed hinge mountings introduce an error into the unilateral mechanisms because the two jaws are coplanar only in one position of adjustment. Unilateral mechanism has a further disadvantage that the centre of the aperture shifts with adjustment, but whilst bilateral mechanism overcomes that problem it is sometimes prohibitive in cost because of duplication of the mounting means necessary to achieve the desired movement of the jaws. Bilateral mechanism also doubles the error in parallelism that might occur because of inaccurate or sloppy mountings. Yet another disadvantage of the known constructions is that each jaw must be accurately formed and accurately located on its mounting.

Prior to this invention unilateral mechanism have been preferred, mainly because of cost, but even so the most effective unilateral mechanisms have been extremely complex in construction. In a commonly used construction, the movable jaw is mounted by flexible leaf springs, and is moved on its mounting by a screw adjustor connected to the jaw through a "wobble pin" or linkage system. In another construction, the jaw is mounted on a ball or roller pivot and is spring influenced towards the open position.

Because of the difficulty and expense associated with adjustable slit mechanism, some monochromators employ a wheel device having several sets of fixed jaws thereon, each defining a respective slit width. One particular disadvantage of that construction is that the range of adjustment is dependent upon the number of jaw sets provided, and adjustment is effected through steps rather than being infinitely variable within the range provided.

SUMMARY OF THE INVENTION

It is a principal object of the present invention to provide adjustable slit mechanism of the bilateral kind which is relatively inexpensive, of simple construction, and effective in operation. It is a further object of the invention to provide a slit defining member for use in such mechanism.

According to one aspect of the present invention, there is provided an optical slit mechanism including; a plate defining two opposed and spaced jaw sections, and hinge means integral with and interconnecting said jaw sections; two substantially flat and parallel mounting surfaces arranged in opposed spaced relationship, at least part of each said jaw section being slidably located between said mounting surfaces and being confined thereby so as to maintain said jaw sections substantially coplanar; and actuator means connected to said plate and operable to cause relative movement of said jaw sections, and said hinge means being arranged to flex during said relative movement.

As the aforementioned plate is of finite thickness (although in the preferred construction that thickness is small), the plane of the jaw sections is to be understood as the median plane of the plate, that is, a plane intermediate and parallel to the two broad opposite faces of the plate.

According to a further aspect of the invention, there is provided an optical slit device comprising a plate which is shaped to define two jaw sections arranged in opposed spaced relationship, hinge means formed integral with an interconnecting said jaw sections.

In both aspects of the invention, the jaw sections are preferably separated from the remainder of the plate except at the connection formed by the hinge means and at a further connection formed by drive means, which may constitute an integral part of the plate and is connected to each jaw section through a relatively narrow section of the plate.

BRIEF DESCRIPTION OF THE DRAWING

The following description refers in more detail to these essential features and further optional features of the invention. To facilitate an understanding of the invention, reference is made to the accompanying drawing where these features are illustrated in preferred form. It is to be understood however, that the essential and optional features of the invention are not limited to the specific forms of these features as shown in the drawing. In the drawing:

FIG. 1 is a plan view of an example construction of slit mechanism made in accordance with the invention and which is suitable for use in a spectrophotometer monochromator.

FIG. 2 is a transverse sectional view taken along line II—II of FIG. 1.

FIG. 3 is a fragmentary plan view taken along line III—III of FIG. 2.

DESCRIPTION OF THE PREFERRED EMBODIMENTS

Figure 4:
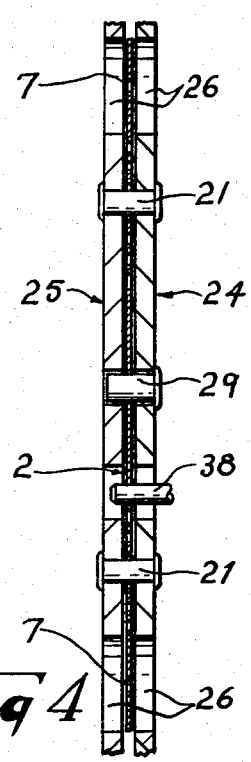
FIG. 4 is an enlarged cross-sectional view taken along line IV—IV of FIG. 3.

Slit mechanism in accordance with the invention includes a slit device in the form of a thin plate or foil, preferably of metal, which is shaped to define the slit jaws or jaw mountings, and hinge portions that interconnect the jaws. That is, at least the jaw mountings and hinge portions for the jaws are formed integral from a single piece of material. If the actual jaws are formed integral with the hinge portions, edges of the foil define the opposed jaw faces between which the optical path passes when the slit mechanism is put into use. Because of the thin nature of the foil, at least part thereof is sandwiched between two flat mounting surfaces so as to maintain the jaws substantially coplanar in all positions of adjustment.

In a preferred embodiment of the invention as shown in FIGS. 1 to 4, the foil 2 is composed of a rectangular sheet of metal such as a beryllium-copper alloy, although it may be made of other materials, and includes the jaws as an integral part. It is a further feature of the preferred construction shown that the foil defines two separate jaw assemblies 3 and 4, each of which includes two jaws 5 and 6 which will be hereinafter referred to as inner and outer jaws respectively for convenience of description. The provision of two jaw assemblies is not essential to the invention, but permits a balanced arrangement as will be clear from the following description, and also permits the mechanism to be used in a dual-slit construction.

Each jaw assembly of the preferred embodiment shown is located at a respective end of the foil and is formed by two sections of the foil that are separated by gaps or parting lines formed in the foil body 2. One gap 7 constitutes the slit and is defined between opposed edges 8 and 9 of the two jaw sections 5 and 6 that are straight and substantially parallel. As shown, those edges 8 and 9 extend substantially at right angles to the longitudinal axis of the foil body, but that is not essential. Each inner jaw 5 is connected to the outer jaw 6 of the other jaw assembly through a bridging section 11 of the foil 2 which, in the construction shown, extends along or defines one longitudinal side of the foil body 2. Each bridging section 11 is preferably in the form of a band of the foil material having a width such as to resist lateral deflection or buckling when subjected to a longitudinal compressive force. The width of the jaw sections 5 and 6 is also preferably such as to resist relative movement between any of the three connected sections 5, 11 and 6, in a direction contained within the plane of the foil 2. Thus, the peripheral shape and relative positions of those three sections are maintained under the forces encountered during adjustment of the slit width, as will be hereinafter explained.

The two jaws 5 and 6 of each jaw assembly may constitute a respective terminal end section of the foil 2 as shown. Each jaw assembly 3 and 4 also includes hinge means 12 which provides the only connection between the two jaws 5 and 6 of that assembly, except perhaps for an indirect connection through drive means (as hereinafter describes) for effecting relative movement of the jaws 5 and 6.

In the particular embodiment of FIGS. 1 and 3, each hinge means 12 includes two hinge portions 13, each of which is connected at one end to a respective jaw 5 or 6, and at the other end to a junction section 14 which is common to the two hinge portions 13. Each hinge portion 13 is in the form of a thin or narrow strap-like section of the foil having a sharp return bend or bight 15 between its ends, but located closer to the jaw end than to the junction end. Thus, each hinge portion has a long part and a short part, which are preferably substantially parallel and in laterally spaced relationship, and each part extends transverse to the longitudinal axis of the foil body 2. The long part of each portion 13 is, in the construction shown, connected to its respective jaw 5 or 6 through a relatively short lateral projection 16 of the strap, which is preferably curved so as to provide a flexure point and is formed integral with a lateral extension 17 or 18 of the jaw section, 5 and 6 respectively, to which it is connected.

Each junction section 14 is relatively broad in area to provide a rigid base for the two hinge portions 13, and is preferably located on the longitudinal axis of the foil body 2, which also bisects each of the jaw edges 8 and 9. The two short parts of the portions 13 are shown connected to respective sides of the junction section 14 so as to be spaced apart in the longitudinal direction of the foil body 2, but that is not essential. It is preferred however, that the two short parts extend in opposite directions away from the junction section 14, and the arrangement is such that the hinge means 12 is substantially symmetrical about both the longitudinal and transverse axes of the junction section 14. In the construction shown, an aperture 19 is provided through each junction section 14 to receive a clamping pin 21 which is effective to firmly clamp the respective junction 1a between the two mounting surfaces 22 and 23 (see FIGS. 2 and 4), thereby restraining the junction sections 14 against substantial movement relative to the mounting surfaces 22 and 23. It is preferred that each aperture 19 is elongated in the longitudinal direction of the foil body 2 so that there is sufficient tolerance to permit the junction sections 14 to be clamped without prestressing the foil body 2, and particularly the hinge portions 12.

A foil 2 as described is shown in FIG. 2 and 4, interposed between two flat mounting surfaces 22 and 23, each or which is defined by a respective plate or block 24 and 25 of suitable rigid material. An aperture 26 is provided in each plate or block 24 and 25 to leave a clear sight passage on each side of the slit 7. Because of the confinement of the foil 2 between the two mounting surfaces 22 and 23, the slit jaws 5 and 6 are maintained coplanar, but are permitted relative movement as hereinafter explained.

Relative movement of the jaws 5 and 6, is effected through drive means which may be or any suitable construction, but in the preferred arrangement shown that means includes a member 27 formed as an integral part of the foil 2. According to that preferred arragement, the drive member 27 is defined by a central portion of the foil body 2 which has a quadrilateral peripheral shape, although a circular or other shape may be employed. An aperture 28 is provided through the centre of the drive member 27 to receive a locating pin 29 connected to the mounting plates or blocks 24 and 25, and that aperture preferably defines the centre of the foil body 2. Furthermore, the aperture 28 should preferably be dimensioned so that the drive member 27 is adapted to rotate freely about the locating pin 29.

In the particular construction shown, the drive member 27 has openings formed therethrough to define a wheel-like device having hub 31 and rim portions 32 joined by a plurality of spoke portions 33. Preferably, fear spokes 33 are provided in equally spaced relationship, and two of those spokes extend along the longitudinal axis of the foil body 2, as shown.

The drive member 27 is preferably connected to the jaw assemblies 3 and 4 through two control straps 34 as shown, each of which extends in the longitudinal direction of the foil body 2 adjacent a respective one of the bridging sections 11. Each control strap 34 connects and is formed integral with the same two jaws 5 and 6 as the respective adjacent bridging section 11, and the drive member 27 is disposed between and connected to those straps 34. It is further preferred to have the drive member 27 arranged so that it is connected to each control strap 34 through a connecting section 35 of the foil body 2 which is located on a central transverse axis of that body — i.e. an axis extending substantially at right angles to the longitudinal axis of the foil body 2 and passing through the centre thereof. Thus, each connecting section 35 is connected to a respective control strap 34 substantially midway in the length of that strap.

It will be appreciated that movement of the drive member 27 about the axis of the locating pin 29, will tend to move the two control straps 34 longitudinally but in opposite directions. Thus, one strap 34 will tend to move two of the jaws 5 and 6 in one direction, whereas the other will tend to move the connected jaws in the opposite direction. When the drive member 27 is turned from its rest position, each control strap 34 will be subjected to tension and compression respectively on opposite sides of its connection 35, and it is thought that the side under compression would tend to suffer slight lateral buckling if it were the only force transmitting element of that side of the drive wheel 27.

Figure 5:
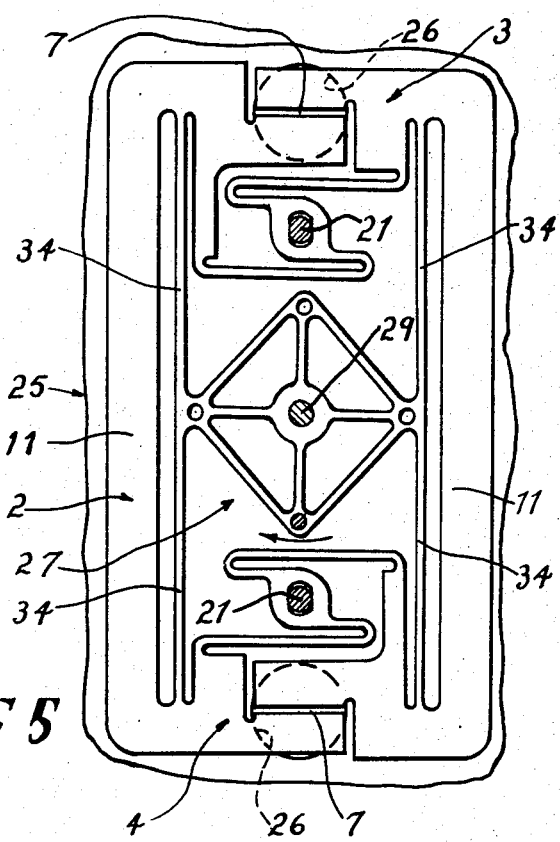
FIG. 5 is a view similar to FIG. 4 but shows the slit plate at a position of adjustment in which the slit width has been narrowed.

The side under tension however, causes movement of the jaw 5 or 6 to which it is connected, and corresponding movement of the jaw connected to the side under compression results from longitudinal movement of the relatively wide bridging section 11 which interconnects the two jaws 5 and 6. It is to be understood that the bridging sections 11 and control straps 34 are held against buckling transverse to the plane of movement because of their confinement between the mounting surface 22 and 23, and relative movement of the inner and outer jaws 5 and 6 is permitted by edgewise flexing of the hinge portions 13. That flexing or bending may extend over a substantial part of the length of each hinge portion 13, and some flexing may also occur at the bights 15 and connections 16 with the jaw sections 5 and 6. FIG. 5 shows the FIG. 3 construction after the member 27 has been rotated about pin 29 in a jaw closing direction.

Turning movement of the drive wheel 27 may be effected through any appropriate actuator means. In the embodiment shown, that means comprises a screw device 36 secured to a support and connected to a peripheral portion of the drive member 27 at a point 37 located on the longitudinal axis of the foil body 2. The axis of the screw device preferably extends transverse to the longitudinal axis of the foil body 2 so that adjustment of the device causes turning movement of the member 27. A separate screw device may be connected to the opposite side of the drive member 27, also at a point on the longitudinal axis of the foil body 2. The use of a micrometer head type arrangement for the screw device 36 facilitates calibration of slit width, but it will be appreciated that other means may be employed for that purpose. It is preferable to have the (or each) actuator 36 connected to the drive member 27 so that the member 27 is restrained against movement relative to the connected portion of the actuator, which in the construction shown is a pin 38. That may be achieved by means of a clearance-free connection or by spring means urging the jaws into the open position.

In the particular construction of FIGS. 1 and 2, the device 36 comprises a spindle 38 having two threaded parts 41 and 42 respectively or different pitches (e.g., 20 and 22 threads per inch respectively). The threaded parts 41 and 42 engage with complementary threads of a movable member 43 and a fixed member 44 respectively. The fixed member 44 is secured to or formed integral with the cover plate 24, and the movable member is connected to the foil 2 through pin 38 as best shown in FIG. 2. The member 43 is arranged so as to be movable over the plate 24 in response to rotation of the spindle 39.

The spindle 39 is supported on opposite sides of the member 43 by the member 44 and a pedestal 45, and an appropriate drive motor 46 is drivably connected to one end of the spindle 39 through a suitable coupling. In the arrangement shown, the drive motor 46 and the adjacent end of the spindle 39 are both secured to a carriage 47 which is slidable within a groove 48 of the plate 24 so as to be movable in the axial direction of the spindle 39 in response to rotation of the members 41 and 42 and their cooperation with the respective screw threads of members 43 and 44.

It is preferred to calibrate the slit width by reference to movement of the spindle 39. That is, it is possible to determine the axial adjustment of the position of member 43, and consequently the adjustment of slit width, by reference to rotation of the spindle 39 by consideration of the relative pitches of the screws 41 and 42. Thus, the slit adjustment corresponding to a single rotation of spindle 39 can be determined and utilised in an appropriate calibration system whereby the instantaneous slit width can be recorded and/or displayed — e.g., by a digital read-out device. A potentiometer 49 responsive to rotation of the spindle 39 preferably forms part of that system, and that potentiometer provides an output signal which is characteristic of the degree of slit adjustment. The system may include means to compensate for mechanical "backlash" in the foil 2 during slit adjustment operations, and that may take any appropriate form.

The actuator means may take numerous forms other than that shown and described.

Figure 6:
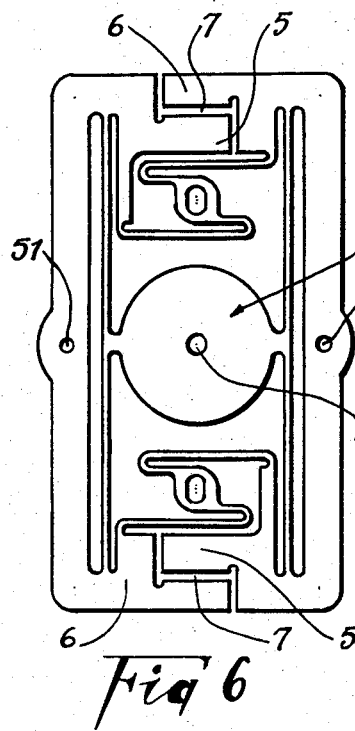
FIG. 6 is a plan view of an improved form of slit plate.
Figure 7:
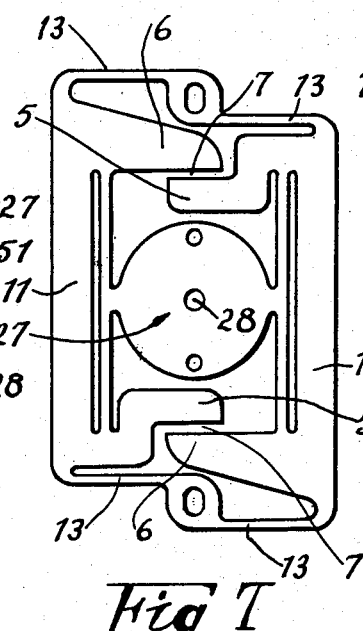
FIG. 7 is yet another modification of the slit plate.
Figure 8:
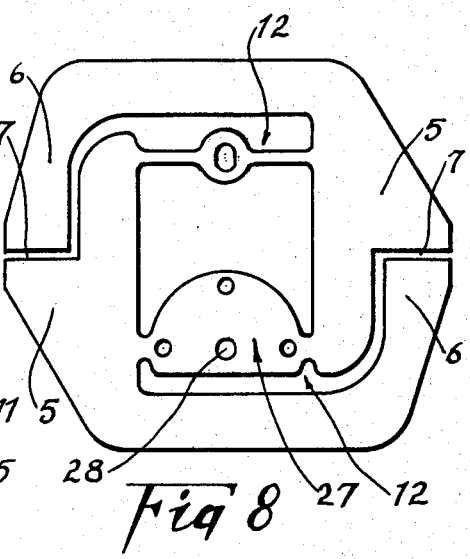
FIG. 8 shows a still further modification of the slit plate.

The foil 2 may be varied in numerous ways without departing from the basic concept of the invention. A variation of the FIG. 3 construction is shown in FIG. 6, and that embodiment is distinguished primarily in that the actuator is connectable to the bridging sections 11 as at 51, rather than to the member 27. Thus, at least one of the sections 11 becomes the drive member, and the member 27 functions as a hub through which drive imparted to one section 11 is transferred to the other section 11. FIG. 7 illustrates yet another variation in which the jaw sections 5 and 6 are disposed between the member 27 and the hinge means 12. FIG. 8 shows an arrangement in which the slits 7 are in lateral alignment and the drive member 27 also functions as one of the hinge means 12.

In the embodiments particularly described and illustrated, the foil is made from a single piece of material such that the jaws, hinges, control straps, and drive member, are all formed integral. The invention may be embodied in varieties of that construction however, such as one in which the foil provides a mounting for separately formed jaw elements. The drive member may be also formed separate from the foil and secured thereto as required. In addition, eyelets or the like may be fixed within apertures of the foil which are subjected to stress so as to guard against wear and/or fracture.

Furthermore, the drive member may be a straight bar rather than a wheel-like device, and in that event the bar may extend between and be pivotably sections (e.g., similar to what is shown in FIG. 8). Many other constructional variations are available, since the basic aim of the invention is satisfied so long as the jaw mountings and interconnecting hinge portions or supports, are formed integral from a thin sheet or foil such as to permit flexure of those hinge portions in the plane of the foil.

It is to be further appreciated that the hinge portions may be straight (as shown in FIGS. 7 and 8) rather than bent as described. In addition, the hinge portions should preferably have a regular material thickness, which is ideally the same as that of the main body of the foil, so as to avoid buckling, but the width of those portions may vary along their length in order to achieve a favourable distribution of bend and stress.

According to yet another modification, the jaw assemblies may be arranged so that one slit opens as the other closes. Still further, in any of the constructions described the two slits may have different widths at any one point of time.

A foil as described may be made in any appropriate manner, such as by stamping, chemical milling, electrochemical milling or photo-etching. The latter method has been found to be satisfactory in that it provides accurate jaw edges and is relatively inexpensive.

It is preferred that the jaw assemblies be arranged so as to adopt their respective mean positions in the relaxed or unstressed condition of the control straps. That is, the natural resilience of the foil acts to urge the jaw assemblies into the position in which the slit width is approximately midway between the maximum and minimum widths available.

A slit mechanism according to the invention has numerous advantages. For example, it provides an accurate bilateral construction at minimum cost. Furthermore, the jaws are coplanar in all positions of adjustment, and movement of the jaws is substantially linear. The symmetry of the hinge means provides a parallelogram-type linkage whereby the jaws are maintained substantially parallel when moved.

Finally, it is to be understood that various alterations, modifications and/or additions may be introduced into the constructions and arrangements of parts previously described without departing from the spirit or ambit of the invention as defined by the appended claims.

Having now described my invention, what I claim as new and desire to secure by Letters Patent Is:

1. An optical system slit mechanism including a plate defining two opposed and spaced jaw sections, and hinge means integral with and interconnecting said jaw sections; two substantially flat and parallel mounting surfaces arranged in opposed spaced relationship, at least part of each said jaw section being slidably located between said mounting surfaces and being confined thereby so as to maintain said jaw sections substantially coplanar with said plate during relative movement of said jaw sections; and actuator means connected to said plate and operable to cause relative movement of said jaw sections, and said hinge means being arranged to flex during said relative movement.

2. Slit mechanism according to claim 1 wherein opposed edges of said jaw sections are substantially straight and parallel and define the adjustable slit of said mechanism between them.

3. Slit mechanism according to claim 1 wherein said hinge means includes two hinge portions, each of which is connected to a respective one of said jaw sections, and a junction portion through which said hinge portions are interconnected, said hinge portions and said junction portion being separated from the remainder of said plate except at the places of connection between said hinge portions and their respective jaw sections.

4. Slit mechanism according to claim 3 wherein each said hinge portion is defined by a relatively narrow strap-like portion of said plate.

5. Slit mechanism according to claim 4 wherein each said hinge portion has a sharp return bend at a zone between its connection to the respective jaw section and junction portion.

6. Slit mechanism according to claim 4 wherein each said hinge portion extends in a direction substantially parallel to a gap between said jaw sections.

7. Slit mechanism according to claim 3 wherein said junction portion is secured against substantial movement relative to said mounting surfaces.

8. Slit mechanism according to claim 1 wherein said jaw sections are separated by gaps in said plate except at the connection formed by said hinge means and at a further connection formed by drive means which constitutes an integral part of said plate, said drive means being connected to each said jaw section through a relatively narrow section of said plate and having said actuator means connected thereto.

9. Slit mechanism according to claim 8 wherein said actuator means is operable to urge rotation of said drive means about an axis located intermediate the connections between that drive means and the said jaw sections and which extends substantially perpendicular to the plane of movement of said jaw sections, and said jaw sections are moved toward or away from each other according to the direction of said rotation.

10. Slit mechanism according to claim 9 wherein said actuator means includes a pin secured to a movable member and connected to said drive means at a position lateral of said rotational axis, said pin extending substantially parallel to said rotational axis, a spindle being drivably connected to an actuator motor and threadably connected with both said movable member and a nut spaced from said movable member and secured to a fixed member, said spindle extending transverse to said rotational axis, and the pitch of the two said screw thread connections being different so that rotation of said spindle causes said movable member to move relative to said spindle in the axial direction thereof and thereby cause rotation of said drive means.

11. Slit mechanism according to claim 10 wherein an electric device is operatively connected to said spindle to permit accurate measurement of the rotary movement of said spindle, and further means is provided whereby the axial movement of said movable member is determined from said measurement.

12. An optical slit device comprising a plate which is shaped to define two jaw sections arranged in opposed spaced relationship, and flexible hinge means formed integral with and interconnecting said jaw sections, said flexible hinge means being configured so that flexing thereof can cause relative movement of said jaw sections in the plane of said plate.

13. An optical slit device according to claim 12 wherein opposed edges of said jaw sections are substantially straight and parallel and define an adjustable slit between them.

14. An optical slit device according to claim 12 wherein said hinge means includes two hinge portions, each of which is connected to a respective one of said jaw sections, and a junction section through which said hinge portions are interconnected, said hinge portions and said junction section being separated from the remainder of said plate except at the connection between said hinge portions and their respective jaw sections.

15. An optical slit device according to claim 14 wherein each said hinge portion is defined by a relatively narrow strap-like section of said plate.

16. An optical slit device according to claim 15 wherein each said hinge portion extends in a direction substantially parallel to a gap between said jaw sections.

17. An optical slit device according to claim 12 wherein said jaw sections are separated by gaps in said plate except at the connection formed by said hinge means and at a further connection formed by drive means which constitutes an integral part of said plate, said drive means being connected to each said jaw section through a relatively narrow section of said plate.

18. A double slit mechanism for an optical system, said mechanism comprising:
an integral plate structure having two slit-defining portions, a drive portion, a bridging portion interconnecting said slit-defining portions, and a strap portion connecting said drive portion with said slit-defining portions, each of said slit-defining portions comprising two opposed jaw sections and flexible hinge means interconnecting said jaw sections; and
actuator means operably connected to said drive portion of said plate structure to cause displacement of said drive portion, said strap portion of said plate structure being responsive to displacement of said drive portion to cause corresponding displacements of the hinge means of each of said slit-defining portions of said plate structure, whereby corresponding relative motion of the jaws of both slit-defining portions is accomplished.

19. The double slit mechanism of claim 18 further comprising mounting means for maintaining said jaw sections substantially coplanar during relative movement of said jaw sections.

20. The double slit mechanism of claim 19 wherein said mounting means comprises a structure providing two substantially parallel surfaces, at least a part of each jaw section of each of said slit-defining portions of said plate structure being disposed between said parallel surfaces.

21. A double slit mechanism for an optical system, said mechanism comprising:
an integral plate structure having two jaw assemblies, each of said jaw assemblies comprising two opposed jaw sections and flexible hinge means interconnecting said two opposed jaw sections, each of said two opposed jaw sections defining a slit therebetween, said plate structure further comprising two separate bridging portions, each of said bridging portions connecting a respective jaw section of one of said jaw assemblies with a respective jaw section of the other of said jaw assemblies; and
actuator means connected to each of said jaw assemblies, said actuator means being operable to move a jaw section of each of said jaw assemblies so as to vary the width of the slit defined for each of said jaw assemblies, each of said bridging portions being responsive to the movement of one of said jaw sections connected thereto so as to cause corresponding movement of the other of said jaw sections connected thereto 22. The double slit mechanism of claim 21 further comprising mounting means for maintaining said jaw sections substantially coplanar during relative movement of said jaw sections.

23. The double slit mechanism of claim 22 wherein said mounting means comprises structure providing two substantially parallel surfaces, at least a part of each jaw section of each of said slit-defining portions of said plate structure being disposed between said parallel surfaces.

24. The double slit mechanism of claim 21 wherein opposed edges of said jaw sections are substantially straight and parallel.

25. The double slit mechanism of claim 21 wherein said flexible hinge means comprises two hinge portions, each hinge portion being connected to a respective one of said two opposed jaw sections, and a junction portion through which said two hinge portions are interconnected, said two hinge portions and said junction portion being integrally connected to the remainder of said plate structure only at the respective places of connection between said two hinge portions and their corresponding jaw sections.

26. The double slit mechanism of claim 25 wherein each of said hinge portions is defined by a relatively narrow strap-like portion of said plate.

27. The double slit mechanism of claim 26 wherein each of said hinge portions has a sharp return bend at a zone between the place of connection of said hinge portion to its corresponding jaw section and the place of connection of said hinge portion to said junction portion.

28. The double slit mechanism of claim 26 wherein each of said hinge portions extends in a direction substantially parallel to a gap between said jaw sections.

29. The double slit mechanism of claim 21 further comprising two substantially flat and parallel mounting surfaces arranged in opposed spaced relationship, at least part of each of said jaw sections being slidably located between said mounting surfaces and being confined thereby so as to maintain said jaw sections substantially coplanar during relative movement of said jaw sections.

30. The double slit mechanism of claim 29 wherein said flexible hinge means comprises two hinge portions, each hinge portion being connected to a respective one of said two opposed jaw sections, and a junction portion through which said two hinge portions are interconnected, said junction portion being secured against substantial movement relative to said mounting surfaces.

31. The double slit mechanism of claim 30 wherein said two hinge portions and said junction portion are integrally connected to the remainder of said plate structure only at the respective places of connection between said two hinge portions and their corresponding jaw sections.

32. The double slit mechanism of claim 21 wherein said actuator means is connected to each of said jaw assemblies by a drive means, said drive means comprising two relatively narrow drive portions of said integral plate structure, each of said drive portions connecting said actuator means with a respective one of said opposed jaw sections.

33. The double slit mechanism of claim 21 wherein said two bridging portions comprise strap-like portions of said integral plate structure.

34. The double slit mechanism of claim 33 wherein said strap-like bridging portions are substantially parallel to each other.

35. The double slit mechanism of claim 32 wherein said two bridging portions comprise strap-like portions of said integral plate structure, and wherein each of said jaw assemblies is connected to the remainder of said integral plate structure at the places of connection of said jaw assembly with said drive portions and with said bridging portions.

36. The double slit mechanism of claim 32 wherein, for each of said jaw assemblies, said actuator means is operable to urge rotation of said drive means about an axis located intermediate the places of connection of said jaw assembly with said drive means, said axis extending substantially perpendicular to the plane of said integral plate structure, said opposed jaw sections being movable toward or away from each other according to the direction of said rotation.

37. The double slit mechanism of claim 36 wherein said actuator means includes a pin secured to a movable member and connected to said drive means at a position lateral of said rotational axis, said pin extending substantially parallel to said rotational axis, a spindle being drivably connected to an actuator motor and threadably connected with both said movable member and a nut spaced from said movable member and secured to a fixed member, said spindle extending transverse to said rotational axis, the pitch of the screw thread connection of said spindle with said movable member being different from the pitch of the screw thread connection of said spindle with said nut, whereby rotation of said spindle causes said movable member to move relative to said spindle in the axial direction of said spindle thereby causing rotation of said drive means.

38. The double slit mechanism of claim 37 further comprising an electric device operatively connected to said spindle to permit accurate measurement of the rotary movement of said spindle, and means responsive to said measurement for determining the axial movement of said movable member.

* * * * *